US011095479B2

(12) United States Patent
Natarajan et al.

(10) Patent No.: US 11,095,479 B2
(45) Date of Patent: Aug. 17, 2021

(54) VXLAN MULTI-TENANT INTER-NETWORKING DEVICE PACKET FORWARDING SYSTEM

(71) Applicant: Dell Products L.P., Round Rock, TX (US)

(72) Inventors: Avinash Natarajan, Tamil Nadu (IN); Damodharan Sreenivasagaperumal, Tamil Nadu (IN); Ramasubramani Mahadevan, Tamil Nadu (IN); Karthik Krishnamurthy, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 29 days.

(21) Appl. No.: 16/669,985

(22) Filed: Oct. 31, 2019

(65) Prior Publication Data

US 2021/0135903 A1 May 6, 2021

(51) Int. Cl.
*H04L 12/46* (2006.01)
*H04L 12/751* (2013.01)
*H04L 12/947* (2013.01)
*H04L 12/761* (2013.01)
*H04L 12/715* (2013.01)

(52) U.S. Cl.
CPC .......... *H04L 12/4675* (2013.01); *H04L 45/02* (2013.01); *H04L 45/04* (2013.01); *H04L 45/16* (2013.01); *H04L 49/252* (2013.01)

(58) Field of Classification Search
None
See application file for complete search history.

(56) References Cited

U.S. PATENT DOCUMENTS

| 10,142,129 B1 * | 11/2018 | Gupta | H04L 12/4641 |
| 2016/0248601 A1 * | 8/2016 | Nomi | H04L 43/0811 |
| 2019/0068496 A1 * | 2/2019 | Tessmer | H04L 12/413 |

* cited by examiner

*Primary Examiner* — Kouroush Mohebbi
(74) *Attorney, Agent, or Firm* — Haynes and Boone, LLP (57) ABSTRACT

A VXLAN multi-tenant inter-networking device packet forwarding system includes a first aggregated networking device coupled to a first host device and a second aggregated networking device that is coupled to second host devices. The first aggregated networking device receives a data packet from the first host device and, in response, identifies a virtual network associated with the first host device. Based on a first and second portion of a virtual network identifier that identifies the virtual network, the first aggregated networking device generates respective first and second packet forwarding identifiers. The first aggregated networking device then provides the first and second packet forwarding identifiers in the data packet, and forwards the data packet to the second aggregated networking device. The second aggregated networking device may then forward the data packet to one of the second host devices based on the first and second packet forwarding identifiers in the data packet.

20 Claims, 8 Drawing Sheets

VXLAN MULTI-TENANT INTER-NETWORKING DEVICE PACKET FORWARDING SYSTEM

BACKGROUND

The present disclosure relates generally to information handling systems, and more particularly to forwarding packets between networking information handling systems provided in a Virtual eXtensible Local Area Network (VXLAN) multi-tenant system As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes provided in a Virtual eXtensible Local Area Network (VXLAN) multi-tenant configuration. As would be appreciated by one of skill in the art, VXLANs are provided by a network virtualization technology that attempts to address the scalability problems associated with large cloud computing deployments, and uses a Virtual Local Area Network (VLAN)-like encapsulation technique to encapsulate Open Systems Interconnect (OSI) layer 2 Ethernet frames within layer 4 User Datagram Protocol (UDP) datagrams. For example, such VXLANs may be utilized with multiple tenant devices such as, for example, server devices, and each of those tenant/server devices may be coupled to one or more aggregated networking devices that provide VXLAN endpoints that terminate VXLAN tunnels, and that are referred to as VXLAN Tunnel EndPoints (VTEPs). Furthermore, those aggregated networking devices may be coupled together via an Inter-Chassis Link (ICL), as well as coupled to a network. The use of VXLANs with multiple tenant/server devices increases the network scalability up to 16 million logical networks, and allows for layer 2 adjacency across IP networks, utilizing multicast or unicast techniques with Head-End Replication (HER) to flood Broadcast, unknown Unicast, and Multicast (BUM) data traffic.

However, in a VXLAN environment, ports on networking devices are mapped to VLANs utilized by the tenant/server devices connected to those ports, and the networking devices may operate in a mode that allows any particular VLAN to be mapped to both of a first port and a first VXLAN segment/virtual network, while also being mapped to both of a second port and a second VXLAN segment/virtual network. However, the operation of aggregated networking devices in the networking device mode described above can raise some issues. For example, a first tenant/server device connected to a first aggregated networking device may utilize a VLAN such that the VLAN is mapped to a first port on the first aggregated networking device that is connected to the first tenant/server device, and with that VLAN mapped to a first VXLAN segment/virtual network utilized by the first tenant/server device as well. In addition, a second tenant/server device connected to a second aggregated networking device may utilize the VLAN such that the VLAN is mapped to a second port on the second aggregated networking device that is connected to the second tenant/server device, and with that VLAN mapped to the first VXLAN segment/virtual network utilized by the second tenant/server device, while a third tenant/server device connected to the second aggregated networking device may utilize the VLAN such that the VLAN is mapped to a third port on the second aggregated networking device that is connected to the third tenant/server device, and with that VLAN mapped to a second VXLAN segment/virtual network utilized by the third tenant/server device.

In configurations like those described above, issues can subsequently arise when the first tenant/server device generates a broadcast data packet and transmits that broadcast data packet to the first aggregated networking device. In addition to encapsulating the broadcast data packet and transmitting the encapsulated broadcast data packet out of multiple VXLAN tunnels to multiple remote VTEPs, an encapsulated broadcast data packet may also need to be transmitted by the first aggregated networking device via the ICL to the second aggregated networking device so that it may be provided to the second tenant/server device connected to the second aggregated networking device (e.g., via an orphan port on the second aggregated networking device.) In conventional systems, the first aggregated networking device will operate to provide a VLAN identifier in the encapsulated broadcast data packet that identifies the VLAN utilized by the first tenant/server device (e.g., the VLAN associated with the first port on the first aggregated networking device that is connected to the first tenant/server device.)

However, when that encapsulated broadcast data packet is received at the second aggregated networking device, the second aggregated networking device will not know which of the second tenant/server device or the third tenant/server device to forward that encapsulated broadcast data packet. In other words, the encapsulated broadcast data packet received by the second aggregated networking device from the first aggregated networking device only includes the VLAN identifier that identifies the VLAN utilized by each of the second tenant/server device and the third tenant/server device, but includes no indication of the first VXLAN segment/virtual network that is utilized by both the first tenant/server device and the second tenant/server device (and to which the VLAN is mapped to with respect to the first port on the first aggregated networking device and the second port on the second aggregated networking device.) As will be appreciated by one of skill in the art, such issues may occur with unicast data traffic flows as well (e.g., orphan port learning operations performed by the second aggregated networking device will point to the ICL/first aggregated networking device, and data packets received from the first aggregated networking device will simply include a VLAN identifier that does not allow the second aggregated networking device to determine which of its connected tenant/server devices to forward the data packet to.)

Conventional solutions to these issues require the user or administrator of the system to explicitly provide separate VLANs for each VXLAN segment/virtual network utilized by tenant/server devices in the system, which may be referred to as ICL-VLANs. As will be appreciated by one of skill in the art, this allows BUM or unicast data traffic for any particular VXLAN segment/virtual network to be transmitted by the first aggregated networking device and via the ICL and to the second aggregated networking device with the ICL-VLAN identifier that identifies the VXLAN segment/virtual network utilized by the tenant/server device that transmitted that data traffic. As such, the second aggregated networking device receiving that data traffic may determine the VXLAN segment/virtual network associated with that data traffic, and thus may determine the appropriate one of its connected tenant/server devices to which to forward that data traffic. However, such conventional solutions limit the scaling of the VLAN usage by the system by a factor of the number of tenant/server devices, as common VLANs may be utilized by multiple tenant/server devices on different ports. For example, in a system that includes twenty tenant/server devices, the aggregated networking devices may utilize respective unique VLANs for each of the tenant/server devices in order to enable the conventional solution discussed above, and such a system would require (20*20=) 400 VLANs to be dedicated for inter-networking device data packet forwarding. The utilization of respective VLANs to identify each tenant/server device that utilizes a VXLAN segment/virtual network restricts the number of VXLAN segments/virtual networks available for use to the number of VLANs available to the system, and utilizes VLANs that could otherwise be provided for underlay connections in the system, non-VXLAN applications, and/or other VLAN uses known in the art.

Accordingly, it would be desirable to provide a VXLAN multi-tenant networking device packet forwarding system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide inter-networking device packet forwarding engine that is configured to: receive, from a first host device that is coupled to the processing system, a data packet; identify, in response to receiving the data packet, a virtual network associated with the first host device; generate, based on a first portion of a virtual network identifier that identifies the virtual network, a first packet forwarding identifier; generate, based on a second portion of the virtual network identifier that identifies the virtual network, a second packet forwarding identifier; provide, in the data packet, the first packet forwarding identifier and the second packet forwarding identifier; and forward the data packet to an aggregated networking device, wherein the first packet forwarding identifier and the second packet forwarding identifier provided in the data packet are configured for use by the aggregated networking device to forward the data packet to one of a plurality of second host devices that are connected to the aggregated networking device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
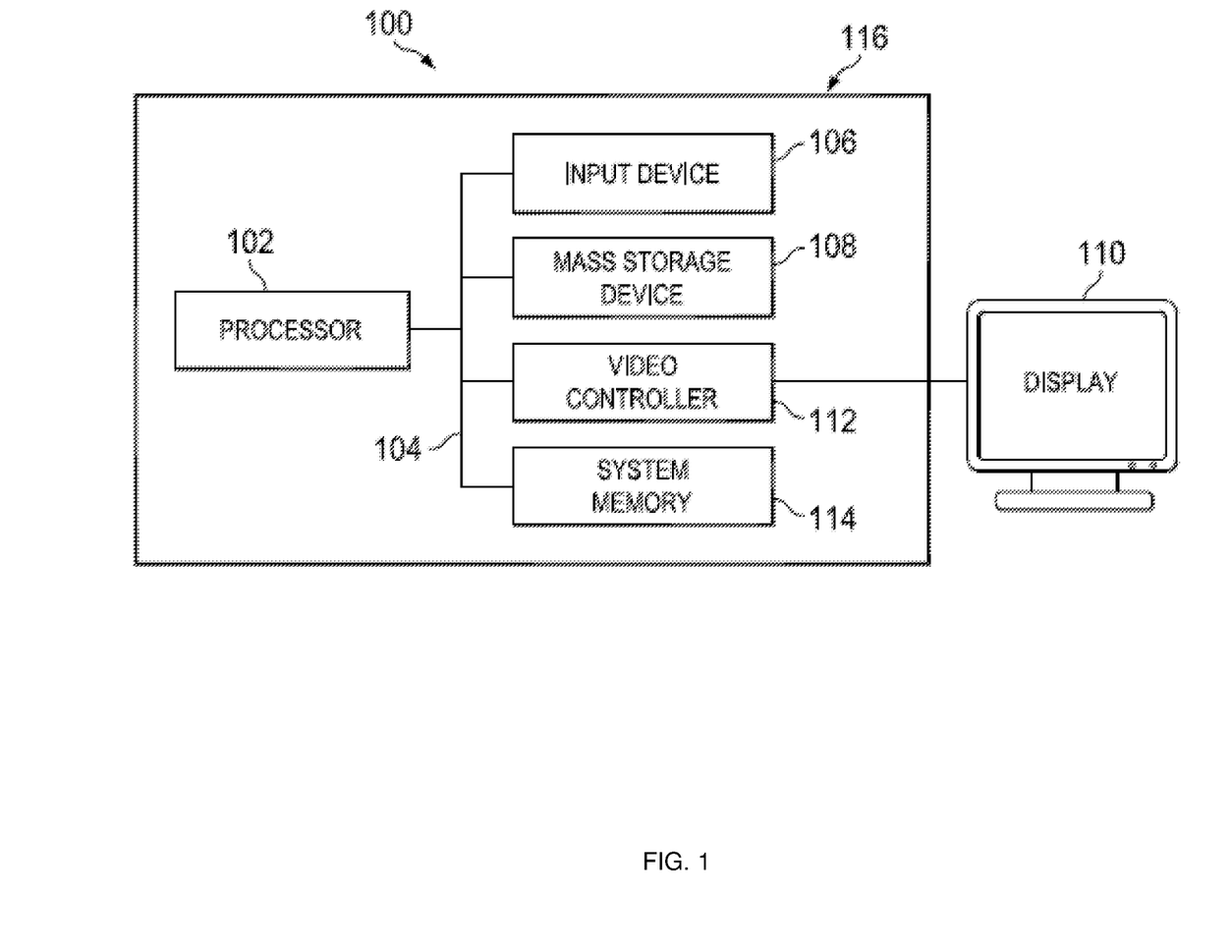
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
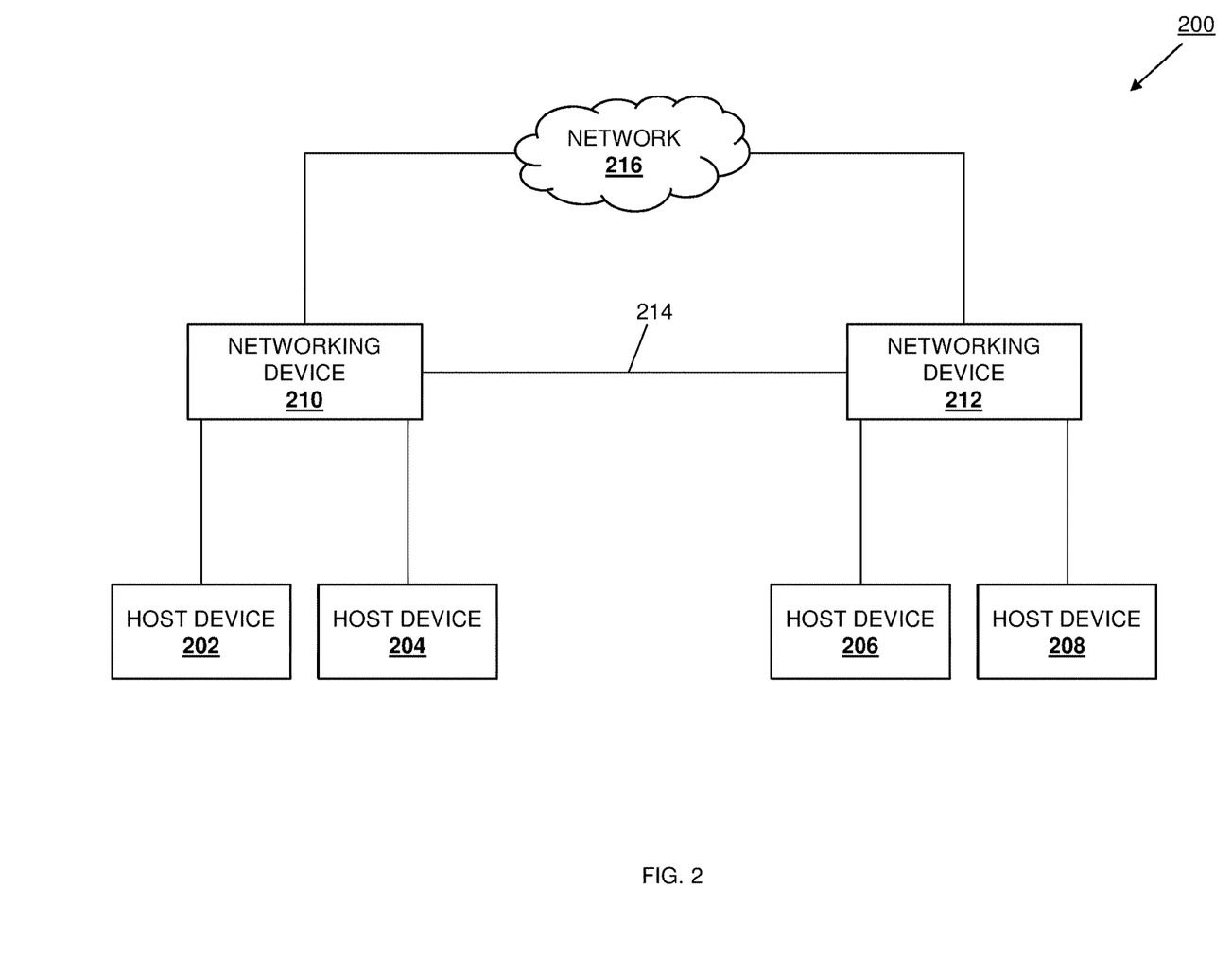
FIG. 2 is a schematic view illustrating an embodiment of a VXLAN multi-tenant inter-networking device packet forwarding system.

Referring now to FIG. 2, an embodiment of a Virtual eXtensible Local Area Newtork (VXLAN) multi-tenant inter-networking device packet forwarding system 200 is illustrated. In the illustrated embodiment, the VXLAN multi-tenant inter-networking device packet forwarding system 200 incudes a plurality of host devices 202, 204, 206 and 208. In an embodiment, any or all of the host devices 202-208 may be provided by the IHS 100 discussed above with reference to FIG. 1, and/or may include some or all of the components of the IHS 100, and in specific examples may be provided by server devices. However, while illustrated and discussed as server devices, one of skill in the art in possession of the present disclosure will recognize that the host devices 202-208 provided in the VXLAN multi-tenant inter-networking device packet forwarding system 200 may include any devices that may be configured to operate similarly as the host devices 202-208 discussed below.

In the illustrated embodiment, the VXLAN multi-tenant inter-networking device packet forwarding system 200 includes a pair of networking devices 210 and 212. In an embodiment, either or both of the networking devices 210 and 212 may be provided by the IHS 100 discussed above with reference to FIG. 1, and/or may include some or all of the components of the IHS 100, and in specific examples may be provided by switch devices. However, while illustrated and discussed as switch devices, one of skill in the art in possession of the present disclosure will recognize that the networking devices 210 and 212 provided in the VXLAN multi-tenant inter-networking device packet forwarding system 200 may include any devices that may be configured to operate similarly as the networking devices 210 and 212 discussed below.

In the illustrated embodiment, the networking device 210 is coupled to each of the host devices 202 and 204 via one or more ports on the networking device 210, and the networking device 212 is coupled to each of the host devices 206 and 208 via one or more ports on the networking device 212, with the networking devices coupled together via an Inter-Chassis Link (ICL) 214. Furthermore, each of the networking devices 210 and 212 are illustrated as coupled to a network 216 that may be provided by a Local Area Network (LAN), the Internet, and/or other networks that would be apparent to one of skill in the art in possession of the present disclosure. While a simple connection configuration between the networking devices 210 and the host devices 202-208 is illustrated for purposes of the discussion below, one of skill in the art in possession of the present disclosure will appreciate that the connection configuration between the networking devices 210 and the host devices 202-208 may (and typically will) be more complicated than that illustrated. For example, the host device 204 may be coupled to each of the networking devices 210 and 212 via links to respective ports on those networking devices 210 and 212 that have been aggregated into a Link Aggregation Group (LAG), the host device 208 may be coupled to an "orphan" port on the networking device 212, and so on.

In a specific example, the networking devices 210 and 212 may be provided by aggregated switch devices that utilize the Virtual Link Trunking (VLT) protocol. As will be appreciated by one of skill in the art in possession of the present disclosure, the VLT protocol is a proprietary aggregation protocol available in switch devices provided by DELL® Inc. of Round Rock, Tex., United States, and operates to provide a redundant, load-balancing connection in a loop-free environment that eliminates the need to use the Spanning Tree Protocol (STP), as well as including other VLT functionality known in the art. As such, with reference to FIG. 2, the networking devices 210 and 212 (e.g., aggregated networking devices) may be provided by VLT peer devices that are coupled together via the ICL 214 provided by a VLT interconnect (VLTi), and may operate to provide a VLT domain, with the pair of VLT peer devices also operating to provide a single, logical Virtual Tunnel End-Point (VTEP). One of skill in the art in possession of the present disclosure will appreciate that, in some embodiments, the links between the aggregated networking devices/VLT peer devices and any of the host devices 202-206 may be provided in a VLT LAG (e.g., the LAG that may be provided between the host device 204 and the networking devices 210 and 212, discussed above.) However, while a specific aggregation protocol is described, one of skill in the art in possession of the present disclosure will recognize that other aggregation protocols may fall within the scope of the present disclosure as well. Furthermore, while a specific VXLAN multi-tenant inter-networking device packet forwarding system 200 has been illustrated and described, one of skill in the art in possession of the present disclosure will recognize that the VXLAN multi-tenant inter-networking device packet forwarding system of the present disclosure may include a variety of components and component configurations while remaining within the scope of the present disclosure as well.

Figure 3:
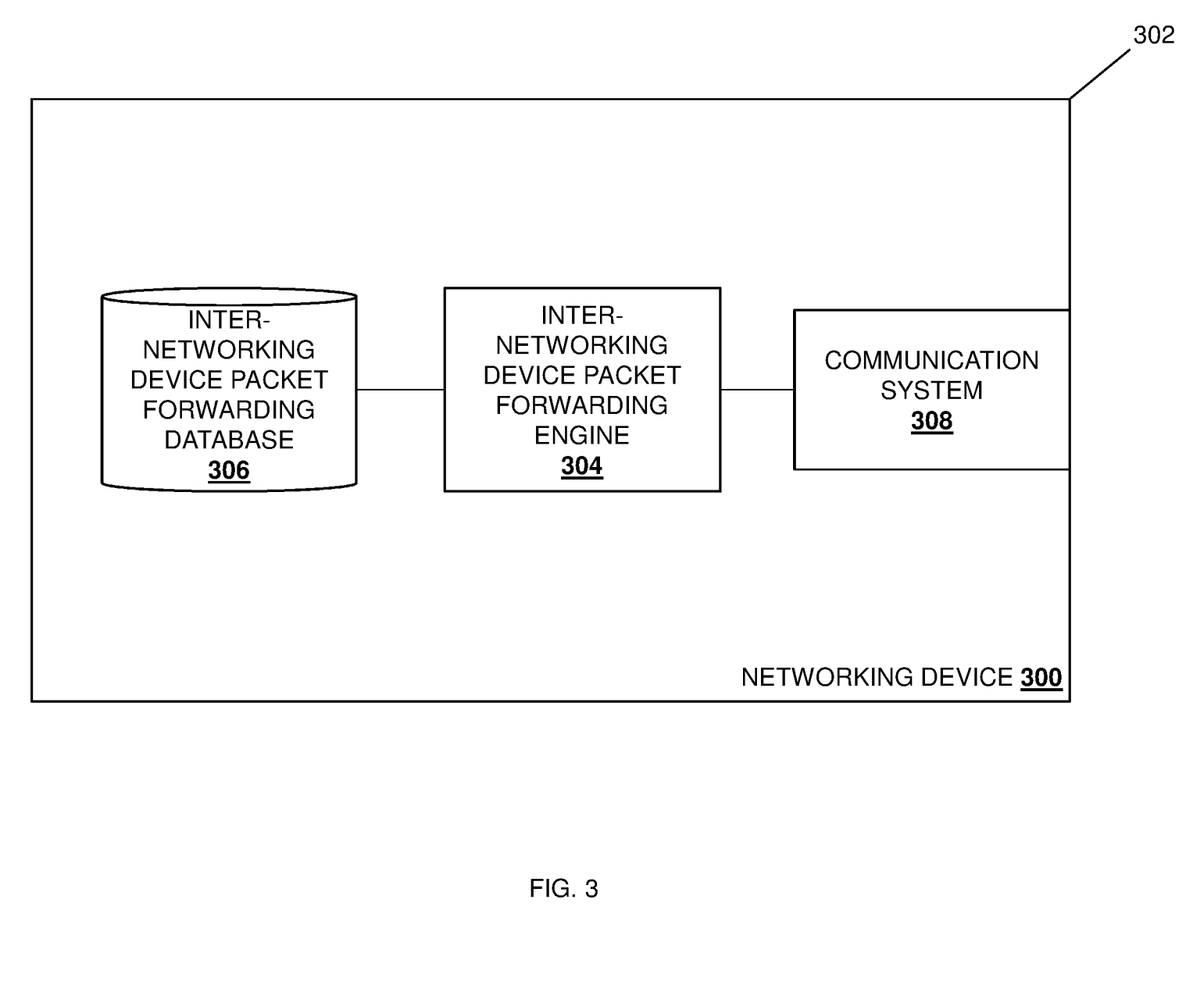
FIG. 3 is a schematic view illustrating an embodiment of a networking device that may be provided in the VXLAN multi-tenant inter-networking device packet forwarding system of FIG. 2.

Referring now to FIG. 3, an embodiment of a networking device 300 is illustrated that may provide either or both of the networking devices 210 and 212 discussed above with reference to FIG. 2. As such, the networking device 300 may be provided by the IHS 100 discussed above with reference to FIG. 1 and/or may include some or all of the components of the IHS 100. Furthermore, while illustrated and discussed as a switch device utilizing the VLT protocol (i.e., operating as a VLT peer device), one of skill in the art in possession of the present disclosure will recognize that the functionality of the networking device 300 discussed below may be provided by other devices that are configured to operate similarly as the networking device 300 discussed below. In the illustrated embodiment, the networking device 300 includes a chassis 302 that houses the components of the networking device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a inter-networking device packet forwarding engine 304 that is configured to perform the functionality of the inter-networking device packet forwarding engines and/or networking devices discussed below.

The chassis 302 may also house a storage system (not illustrated, but which may include the storage 108 discussed above with reference to FIG. 1) that is coupled to the inter-networking device packet forwarding engine 304 (e.g., via a coupling between the storage system and the processing system) and that includes a inter-networking device packet forwarding database 306 that is configured to store any of the information utilized by the inter-networking device packet forwarding engine 304 discussed below. The chassis 302 may also house a communication system 308 that is coupled to the inter-networking device packet forwarding engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As such, one of skill in the art in possession of the present disclosure will appreciate that the communication system 308 may include any of the ports utilized on the networking devices 300 discussed below. While a specific networking device 300 has been illustrated, one of skill in the art in possession of the present disclosure will recognize that networking devices (or other devices operating according to the teachings of the present disclosure in a manner similar to that described below for the networking device 300) may include a variety of components and/or component configurations for providing conventional networking device functionality, as well as the functionality discussed below, while remaining within the scope of the present disclosure as well.

Figure 4:
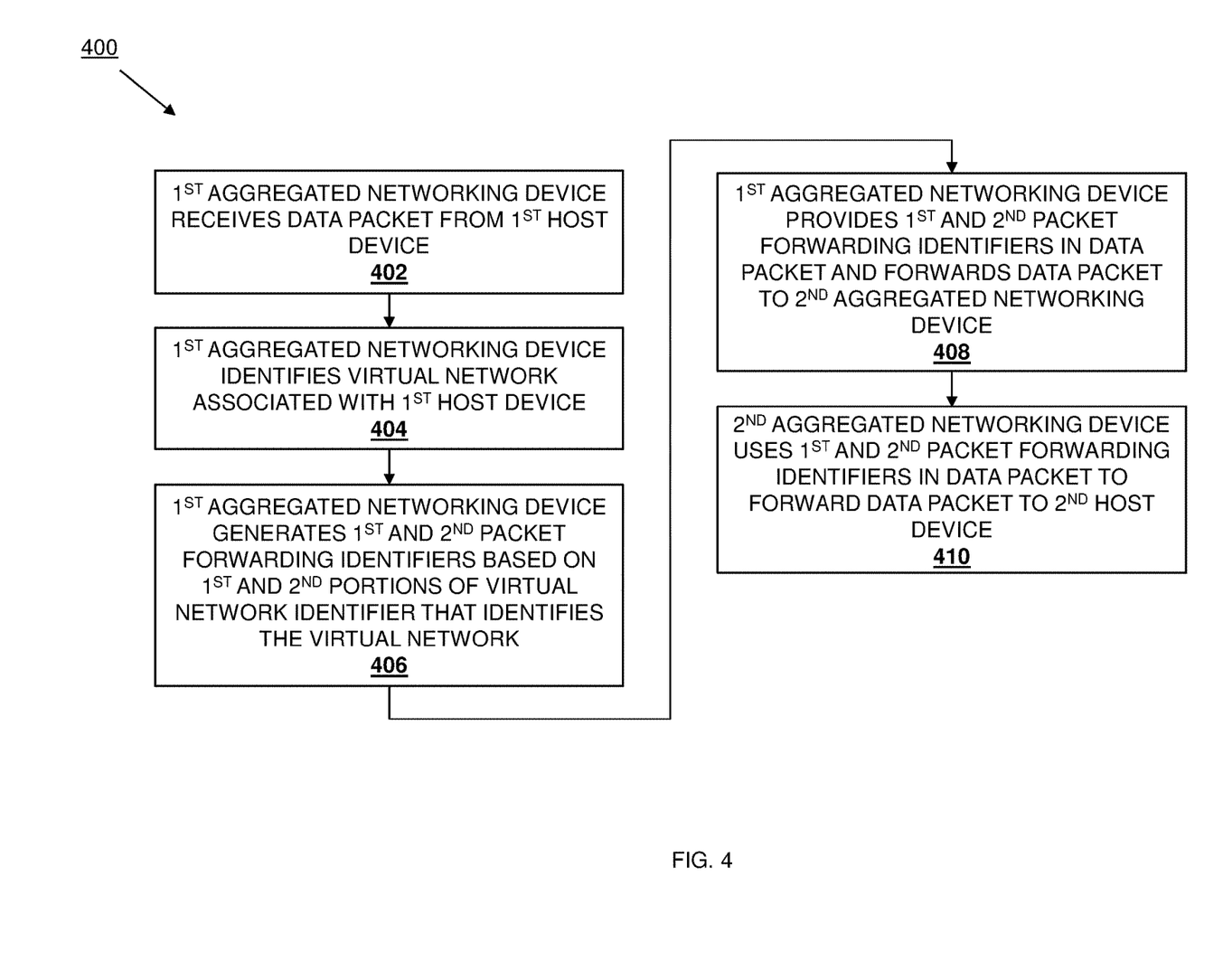
FIG. 4 is a flow chart illustrating an embodiment of a method for forwarding packets between networking devices in a VXLAN multi-tenant system.

Referring now to FIG. 4, an embodiment of a method 400 for forwarding packets between networking devices in a VXLAN multi-tenant system is illustrated. As discussed below, the systems and methods of the present disclosure provide for the forwarding of data packets transmitted between networking devices in a manner that allows the networking device receiving those data packets to identify the VXLAN segment/virtual network to which that data packet belongs, thus allowing for a determination of which of a plurality of connected host devices that networking device should forward those data packets to. For example, a first aggregated networking device may receive a data packet from its connected first host device and, in response, identify a VXLAN segment/virtual network associated with that first host device. Based on first and second portions of a virtual network identifier that identifies the VXLAN segment/virtual network, the first aggregated networking device may generate respective first and second packet forwarding identifiers, and provide those first and second packet forwarding identifiers in the data packet. The first aggregated networking device may then forward the data packet to a second aggregated networking device, and the second aggregated networking device may then forward the data packet to one of a plurality of its connected second host devices based on the first and second packet forwarding identifiers provided in the data packet. As such, the number of VXLAN segments/virtual networks supported by the system may be limited only by the hardware platform (rather than the system VLAN limit of 4000 VLANs), and as discussed below may scale up to 8000 VLAN segments and up to 4096 VLANs in many conventional switch devices. Furthermore, the number of tenant host/server devices, and the number of common VLANs mapping different VXLAN segments/virtual networks to those tenant host/server devices, is not limited by the system VLAN limit, and instead is only limited by the number of VXLAN segments/virtual networks that are supported by the system. Further still, the systems and methods of the present disclosure present no restriction on the use of VLANs for non-VXLAN applications, as VLANs are not being utilized for inter-networking devices communications as is done in conventional systems.

Figure 5:
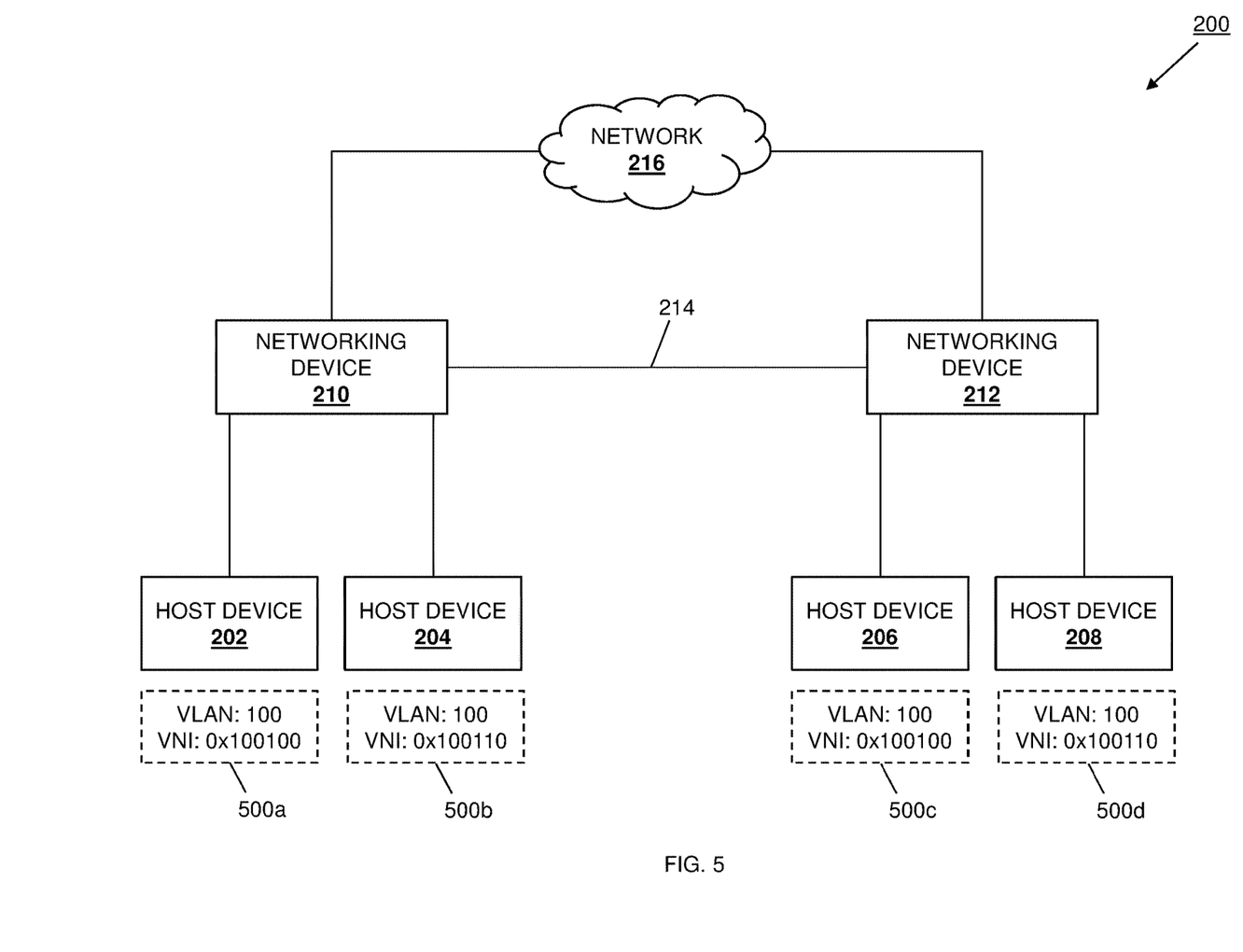
FIG. 5 is a schematic view illustrating an embodiment of the operation of the VXLAN multi-tenant inter-networking device packet forwarding system of FIG. 2 during the method of FIG. 4.

With reference to FIG. 5, during or prior to the method 400, the host devices 202-208 in the VXLAN multi-tenant inter-networking device packet forwarding system 200 may be provided as tenant devices in a multi-tenant configuration. For example, FIG. 5 illustrates how each of the host devices 202-208 may utilize the same VLAN 100 in FIG. 5, with the host devices 202 and 206 utilizing the same first VXLAN segment/virtual network that is identified by the Virtual Network Interface (VNI) identifier 0x100100 in FIG. 5, and with the host devices 204 and 208 utilizing the same second VXLAN segment/virtual network that is identified by the VNI identifier 0x100110 in FIG. 5. As will be appreciated by one of skill in the art in possession of the present disclosure, in such a multi-tenant device configuration, the port on the networking device 210/300 connected to the host device 202 will then be mapped to the VLAN 100 and VNI identifier 0x100100 in its inter-networking device packet forwarding database 306 (as indicated by element 500a), and the port on the networking device 210/300 connected to the host device 204 will then be mapped to the VLAN 100 and VNI identifier 0x100110 in its inter-networking device packet forwarding database 306 (as indicated by element 500b). Similarly, the port on the networking device 212/300 connected to the host device 206 will then be mapped to the VLAN 100 and VNI identifier 0x100100 in its inter-networking device packet forwarding database 306 (as indicated by element 500c), and the port on the networking device 210/300 connected to the host device 208 will then be mapped to the VLAN 100 and VNI identifier 0x100110 in its inter-networking device packet forwarding database 306 (as indicated by element 500d). As such, the VLAN 100 is mapped to respective different VXLAN segments/virtual networks on respective different ports on each networking device. However, while a specific multi-tenant configuration is illustrated and described herein, one of skill in the art in possession of the present disclosure will recognize that other multi-tenant configurations will fall within the scope of the present disclosure as well.

Figure 6A:
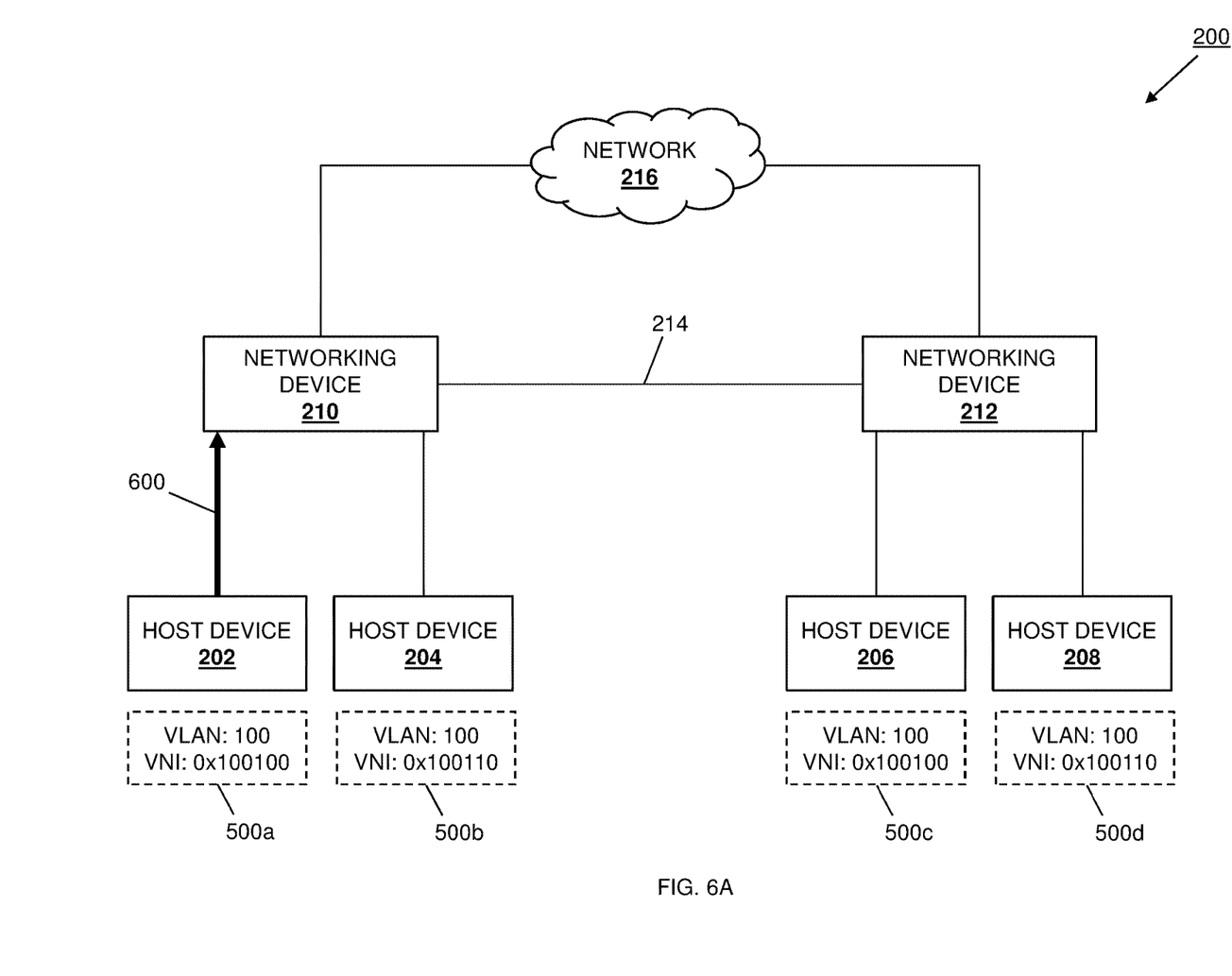
FIG. 6A is a schematic view illustrating an embodiment of the operation of the VXLAN multi-tenant inter-networking device packet forwarding system of FIG. 2 during the method of FIG. 4.

The method 400 begins at block 402 where a first aggregated networking device receives a data packet from a first host device. As illustrated in FIG. 6A, in an embodiment of block 402, the host device 202 may generate and transmit a data packet 600 to the networking device 210. In some embodiments, the data packet 600 may be included in Broadcast, unknown Unicast, and Multicast (BUM) data traffic generated and transmitted by the networking device 210. Furthermore, in other embodiments, the data packet 600 may be included in known unicast data traffic that is destined to be transmitted via an orphan port on the networking device 212. However, while a few example of data packets and data traffic have been described, one of skill in the art in possession of the present disclosure will recognize that the teachings of the present disclosure may apply to other types of data packets and/or data traffic while remaining within the scope of the present disclosure as well. Furthermore, while the data packet 600 is described below as being transmitted between the host device 202 and the host device 206, one of skill in the art in possession of the present disclosure will appreciate that the method 400 may provide for the transmission of data packets between any host devices while remaining within the scope of the present disclosure. Thus, at block 402, the inter-networking device packet forwarding engine 304 in the networking device 210/300 may receive the data packet 600 via its communication system 308.

The method 400 then proceeds to block 404 where the first aggregated networking device identifies a virtual network associated with the first host device. In an embodiment, at block 404 and in response to receiving data packet 600 from the host device 202, the inter-networking device packet forwarding engine 304 in the networking device 210/300 may identify the VXLAN segment/virtual network associated with that host device 202. For example, as discussed above, the port on the networking device 210/300 connected to the host device 202 may be mapped to the VLAN 100 and VNI identifier 0x100100 in its inter-networking device packet forwarding database 306 (as indicated by element 500a), and upon receiving the data packet 600 via the port connected to the host device 202, the inter-networking device packet forwarding engine 304 in the networking device 210/300 may access that mapping in its inter-networking device packet forwarding database 306 to determine that the VXLAN segment/virtual network identified by the VNI identifier 0x100100 is associated with the host device 202/data packet 600. However, while a specific example of determining a VXLAN segment/virtual network associated with a host device has been described, one of skill in the art in possession of the present disclosure will recognize that other techniques for identifying VXLAN segment/virtual network-host device associations may fall within the scope of the present disclosure as well.

As discussed above, the processing of a data packet included in BUM data traffic by the inter-networking device packet forwarding engine 304 in the networking device 210/300 may include encapsulating and transmitting that data packet 600 out of multiple VXLAN tunnels to remote networking devices (e.g., networking devices coupled to the network 216 and operating as remote VXLAN Tunnel EndPoint (VTEP) devices), as well as determining that the data packet 600 should be sent via the ICL 214 and the networking device 212 to the host device 206 (e.g., which as discussed above may utilize the same VLAN and VXLAN segment/virtual network, and may provide an "orphan device" connected to an "orphan port" on the networking device 212.) As discussed above, in multi-tenant configurations such as that described above with reference to FIG. 5, conventional systems would default to providing a VLAN identifier that identifies the VLAN 100 in the data packet 600, and forwarding that data packet 600 to the networking device 212. However, as also discussed above, the utilization of the VLAN 100 by both of the host devise 206 and 208 in the multi-tenant configuration illustrated in FIG. 5 will result in the networking device 212 being unable to determine to which of those host devices 206 and 210 to forward the data packet 600 (i.e., because the data packet 600 received by the networking device 212 does not identify the VXLAN segment/virtual network utilized by both the host devices 202 and 206.) Furthermore, as also discussed above, similar issues also exist with known unicast data packets/data traffic. As described below, the systems and methods of the present disclosure provide for the identification of VXLAN segments/virtual networks in the data packet 600 without the need to use up VLANs/VLAN identifiers as is required in conventional inter-networking device packet forwarding systems.

The method 400 then proceeds to block 406 where the first aggregated networking device generates first and second packet forwarding identifiers based on first and second portions of a virtual network identifier that identifies the virtual network. In an embodiment, at block 406, the inter-networking device packet forwarding engine 304 in the networking device 210/300 may generate packet forwarding identifier(s) based on portion(s) of a VXLAN segment/virtual network identifier that identifies the VXLAN segment/virtual network associated with the host device 202. Continuing with the example above, the VNI identifier 0x100100 may provide the VXLAN segment/virtual network identifier that identifies the VXLAN segment/virtual network utilized by the host device 202, and that VNI identifier may utilize 24 bits to identify that VXLAN segment/virtual network. As such, in some embodiments, the inter-networking device packet forwarding engine 304 in the networking device 210/300 may "split" the VNI identifier into two 12-bit portions that provide two packet forwarding identifiers.

For example, the inter-networking device packet forwarding engine 304 in the networking device 210/300 may utilize a first portion of that VNI identifier 0x100100 (e.g., a first 12 bits of that VNI identifier, or "100") to generate a first packet forwarding identifier (e.g., 0x100). Similarly, the inter-networking device packet forwarding engine 304 in the networking device 210/300 may utilize a second portion of that VNI identifier 0x100100 (e.g., a second 12 bits of that VNI, or "100") to generate a second packet forwarding identifier (e.g., 0x100). As will be appreciated by one of skill in the art in possession of the present disclosure, in the example above the first 12 bits of the VNI identifier may be considered the "most significant" bits of that VNI identifier, while the second 12 bits of the VNI identifier may be considered the "least significant" bits of that VNI identifier. However, while specific packet forwarding identifiers generated from specific portions of a VNI identifier have been described, one of skill in the art in possession of the present disclosure will recognize that the packet forwarding identifier(s) of the present disclosure may be generated in a variety of manners from a VXLAN segment/virtual network identifier in a manner that is consistent across networking devices (e.g., VLT peer devices) and that requires no user intervention (or VLT synchronization) while remaining within the scope of the present disclosure as well.

In some of the specific examples discussed below, the second packet forwarding identifier may be utilized to identify a VNI-VLAN identifier, and in such embodiments it may be desirable to prevent the provisioning of a VNI-VLAN identifier with a zero value (e.g., as the networking device 212 may not be configured to process a data packet that identifies a VLAN with a value of zero.) As such, in those examples, the inter-networking device packet forwarding engine 304 in the networking device 210/300 may operate to add "1" to any second packet forwarding identifier generated from the second portion of the VNI identifier in order to ensure that the VNI-VLAN identifier does not have a value of zero in situations in which the second portion of the VNI identifier initially would provide a zero value for that VNI-VLAN identifier. As such, continuing with the example above, the inter-networking device packet forwarding engine 304 in the networking device 210/300 may utilize a second portion of that VNI identifier 0x100100 (e.g., a second 12 bits of that VNI identifier, or "100") to generate a second packet forwarding identifier (e.g., 0x101, which is that second 12 bits of that VNI identifier with "1" added to it). As will be appreciated by one of skill in the art in possession of the present disclosure, there will be situations where adding "1" to the second 12 bits of the VNI identifier will result in a zero value for the VNI-VLAN identifier, and thus VNI identifiers with those second 12 bits (e.g., a second 12 bits equal to 4095) may prevented from being utilized in the VXLAN multi-tenant inter-networking device packet forwarding system 200 (i.e., any VNI identifier with those second 12 bits may be identified and rejected, while requiring the user or administrator of the system to select a different VNI identifier.)

Figure 6B:
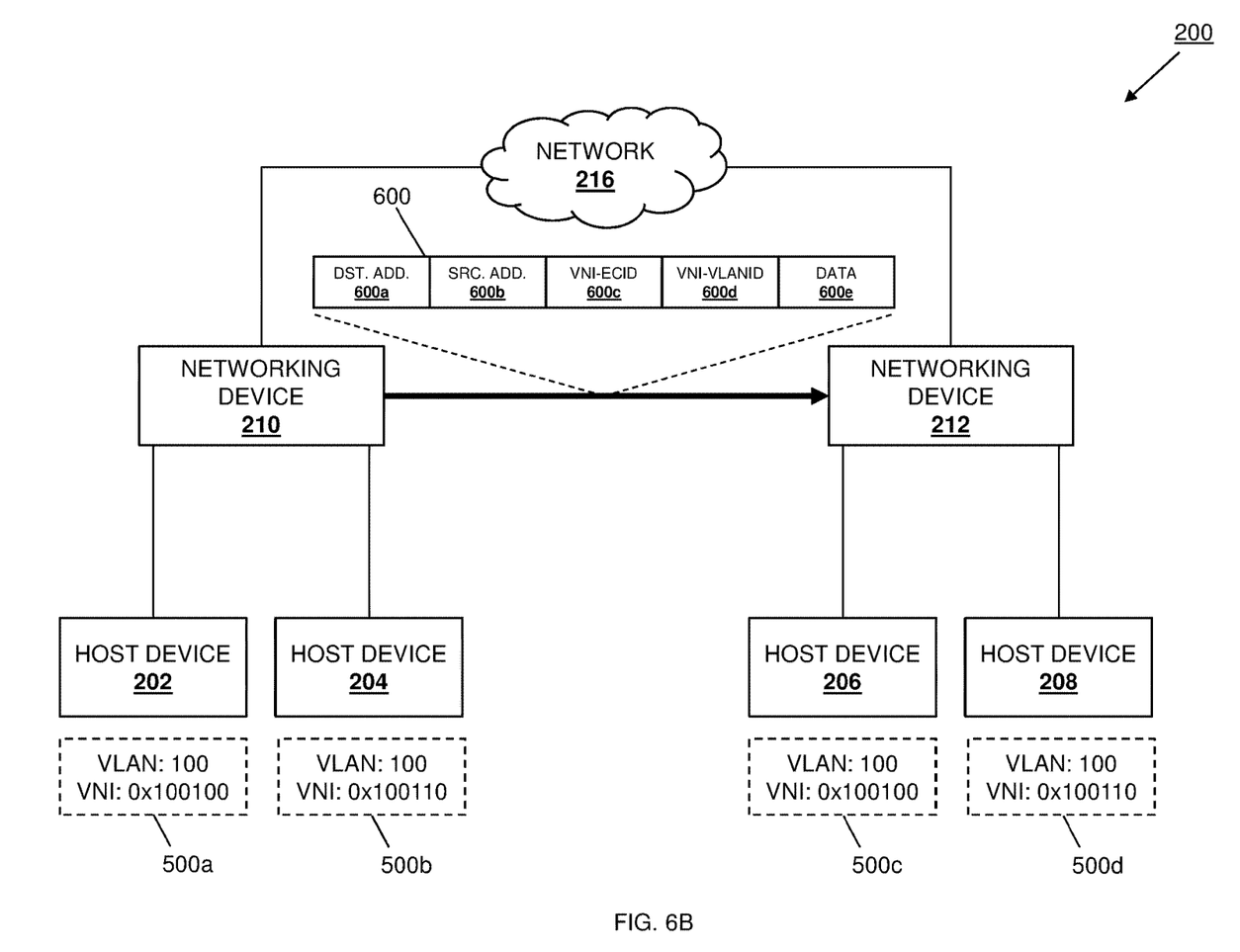
FIG. 6B is a schematic view illustrating an embodiment of the operation of the VXLAN multi-tenant inter-networking device packet forwarding system of FIG. 2 during the method of FIG. 4.

The method 400 then proceeds to block 408 where the first aggregated networking device provides the first and second packet forwarding identifiers in the data packet and forwards the data packet to a second aggregated networking device. As illustrated in FIG. 6B, in an embodiment of block 408, the inter-networking device packet forwarding engine 304 in the networking device 210/300 may operate to provide the packet forwarding identifier(s) in the data packet 600, and forward that data packet to the networking device 212. For example, at block 408, the inter-networking device packet forwarding engine 304 in the networking device 210/300 may operate to provide the first packet forwarding identifier in a first field in the data packet 600, provide the second packet forwarding identifier in a second field in the data packet 600, and then forward that data packet to the networking device 212.

As illustrated in FIG. 6B, in some embodiments, the data packet 600 may include a destination address field 600a, a source address field 600b, a VNI-ECID field 600c, a VNI-VLANID field 600d, and data field 600e. For example, switch devices such as those available from BROADCOM® Inc. of San Jose, Calif., United States, may allow for data packets with an E-Channel Identifier (ECID) field that may include ECIDs (e.g., E-channel TAGs (ETAGs)) that are 12 bits in length, as well as a VLAN IDentifier (VLANID) field that may include VLAN identifiers that are 12 bits in length. As such, the inter-networking device packet forwarding engine 304 in the networking device 210/300 may utilize the ECID field in such data packets as the VNI-ECID field 600c illustrated in FIG. 6B, and may utilize the VLANID field in such data packets as the VNI-VLANID field 600d illustrated in FIG. 6B. Thus, continuing with the example provided below, at block 408 the inter-networking device packet forwarding engine 304 in the networking device 210/300 may provide the first packet forwarding identifier (e.g., 0x100 in the example above) in the VNI-ECID field 600c, and may provide the second packet forwarding identifier (e.g., 0x100 or 0x101 in the examples above) in the VNI-VLANID field 600d, and then may forward that data packet 600 via its communication system 308 and through the ICL 214 to the networking device 212. However, while specific examples have been illustrated and are described above, one of skill in the art in possession of the present disclosure will appreciate that packet forwarding identifier(s) provided according to the teachings of the present disclosure may be provided in data packets transmitted between aggregated networking device in a variety of manners that will fall within the scope of the present disclosure as well.

The method 400 then proceeds to block 410 where the second aggregated networking device uses the first and second packet forwarding identifiers in the data packet to forward the data packet to a second host device. In an embodiment, at block 410, the inter-networking device packet forwarding engine 304 in the networking device 212/300 may receive the data packet 600 via its communication system 308, and may identify the packet forwarding identifiers included therein. As such, continuing with the examples provided above, the inter-networking device packet forwarding engine 304 in the networking device 212/300 may identify the first packet forwarding identifier (e.g., 0x100 in the example above) in the VNI-ECID field 600c of the data packet 600, and may identify the second packet forwarding identifier (e.g., 0x100 or 0x101 in the examples above) in the VNI-VLANID field 600d of the data packet 600.

Figure 6C:
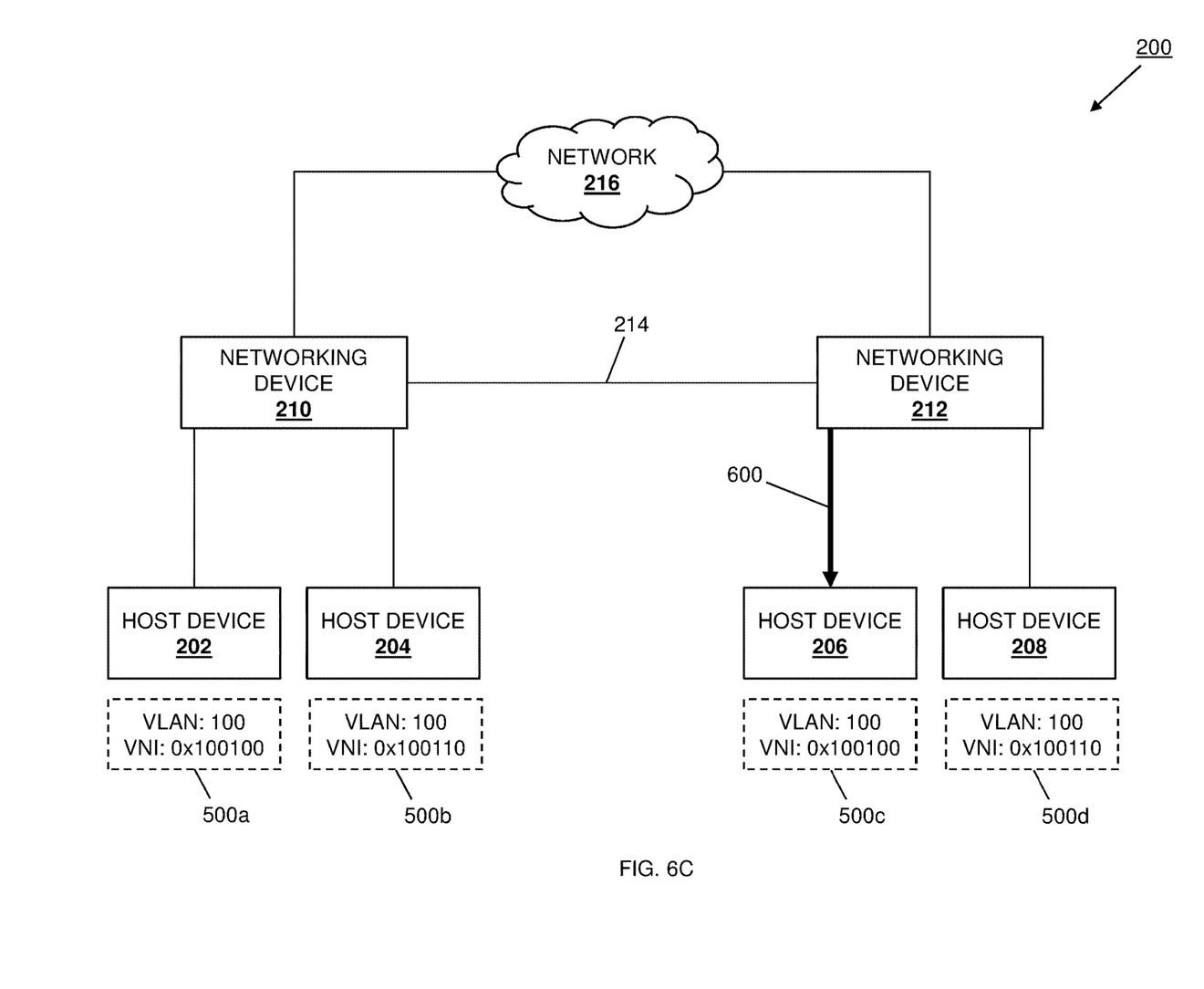
FIG. 6C is a schematic view illustrating an embodiment of the operation of the VXLAN multi-tenant inter-networking device packet forwarding system of FIG. 2 during the method of FIG. 4.

The inter-networking device packet forwarding engine 304 in the networking device 212/300 may then utilize the first packet forwarding identifier (e.g., 0x100 in the example above) and the second packet forwarding identifier (e.g., 0x100 or 0x101 in the examples above) to identify the VXLAN segment/virtual network identifier associated with that data packet 600 (e.g., 0x100100 in this example), and access its inter-networking device packet forwarding database 306 to determine that its port connected to the host device 206 is associated with that VXLAN segment/virtual network identifier (e.g., 0x100100 in this example). As such, as illustrated in FIG. 6C, the inter-networking device packet forwarding engine 304 in the networking device 212/300 may forward the data packet 600 to the host device 206, which as discussed above utilizes the same VXLAN segment/virtual network (0x100100 in this example) as the host device 202. As will be appreciated by one of skill in the art in possession of the present disclosure, the scope and life of the first packet forwarding identifier and the second packet forwarding identifier in the VNI-ECID field 600c and the VNI-VLANID field 600d in the data packet 600 may be restricted to the encapsulation point on the networking device 210 and the decapsulation point on the networking device 212 (where the VXLAN segment/virtual network associated with that data packet 600 is derived) and, as such, that derived VXLAN segment/virtual network may coincide with an existing user VLAN while having no impact on the existing user VLANs data traffic flows.

Thus, systems and methods have been described that provide for the forwarding of data packets transmitted between VLT peer devices in a manner that allows the VLT peer device receiving those data packets to identify the VXLAN segment to which that data packet belongs, thus allowing for a determination of which of a plurality of connected tenant devices that VLT peer device should forward those data packets to. For example, a first VLT peer device may receive a data packet from its connected first tenant device and, in response, identify a VXLAN segment associated with that first tenant device. Based on first and second portions of a VXLAN identifier that identifies the VXLAN segment, the first VLT peer device may generate respective first and second packet forwarding identifiers, and provide those first and second packet forwarding identifiers in the data packet. The first VLT peer device may then forward the data packet to a second VLT peer device, and the second VLT peer device may then forward the data packet to one of a plurality of second server devices based on the first and second packet forwarding identifiers provided in the data packet. As such, the number of VXLAN segments supported by the system may be limited only by the hardware platform (rather than the system VLAN limit of 4000 VLANs), and may scale up to 8000 VLANs in many conventional switch devices. Furthermore, the number of tenant devices, and the number of common VLANs mapping different VXLAN segments/virtual networks to those tenant devices, is not limited by the system VLAN limit, and instead is only limited by the number of VXLAN segments/virtual networks that are supported by the system. Further still, the systems and methods of the present disclosure present no restriction on the use of VLANs for non-VXLAN applications, as VLANs are not being utilized for inter-networking devices communications as is done in conventional systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Virtual eXtensible Local Area Network (VXLAN) multi-tenant inter-networking device packet forwarding system, comprising:
a second aggregated networking device that is coupled to a plurality of second host devices; and
a first aggregated networking device that is coupled to the second aggregated networking device via an Inter-Chassis Link (ICL) and that is coupled to a first host device, wherein the first aggregated networking device and the second aggregated networking device are aggregated according to an aggregation protocol to provide an aggregation domain that causes the first aggregated networking device and the second aggregated networking device to be presented as a single logical networking device, and wherein the first aggregated networking device is configured to:
receive, from the first host device, a data packet;
identify, in response to receiving the data packet, a virtual network associated with the first host device;
generate, based on a first portion of a virtual network identifier that identifies the virtual network, a first packet forwarding identifier; generate, based on a second portion of the virtual network identifier that identifies the virtual network, a second packet forwarding identifier;
provide, in the data packet, the first packet forwarding identifier and the second packet forwarding identifier; and
forward, via the ICL, the data packet to the second aggregated networking device, wherein the second aggregated networking device is configured to:
forward the data packet to one of the plurality of second host devices based on the first packet forwarding identifier and the second packet forwarding identifier provided in the data packet.

2. The system of claim 1, wherein the data packet is a Broadcast, unknown Unicast, and Multicast (BUM) data packet.

3. The system of claim 1, wherein the identifying the virtual network associated with the first host device includes:
identifying a Virtual Network Interface (VNI) identifier that provides the virtual network identifier and that is associated with a port on the first aggregated networking device that is connected to the first host device.

4. The system of claim 3, wherein the generating the first packet forwarding identifier based on the first portion of the virtual network identifier, and the generating the second packet forwarding identifier based on the second portion of the virtual network identifier, includes:
generating, using a first 12 bits of the VNI identifier, the first packet forwarding identifier; and
generating, using a second 12 bits of the VNI identifier, the second packet forwarding identifier.

5. The system of claim 1, wherein the first aggregated networking device is configured to:
provide the first packet forwarding identifier in an E-Channel Identifier (ECID) field included in the data packet; and
provide the second packet forwarding identifier in a VLAN identifier field included in the data packet.

6. The system of claim 1, wherein the forwarding the data packet to one of the plurality of second host devices based on the first packet forwarding identifier and the second packet forwarding identifier provided in the data packet includes:
identifying, using the first packet forwarding identifier and the second packet forwarding identifier provided in the data packet, the virtual network;
determining the one of the plurality of second host devices that is associated with the virtual network; and
forwarding the data packet to that one of the plurality of second host devices.

7. An Information Handling System (IHS), comprising:
a processing system; and
a memory system that is coupled to the processing system and that includes instructions that, when executed by the processing system, cause the processing system to provide inter-networking device packet forwarding engine that is configured to:
receive, from a first host device that is coupled to the processing system, a data packet;
identify, in response to receiving the data packet, a virtual network associated with the first host device;
generate, based on a first portion of a virtual network identifier that identifies the virtual network, a first packet forwarding identifier;
generate, based on a second portion of the virtual network identifier that identifies the virtual network, a second packet forwarding identifier;
provide, in the data packet, the first packet forwarding identifier and the second packet forwarding identifier; and
forward, via an Inter-Chassis Link (ICL), the data packet to an aggregated networking device, wherein the first packet forwarding identifier and the second packet forwarding identifier provided in the data packet are configured for use by the aggregated networking device to forward the data packet to one of a plurality of second host devices that are connected to the aggregated networking device, wherein the IHS and the aggregated networking device are aggregated according to an aggregation protocol to provide an aggregation domain that causes the first aggregated networking device and the second aggregated networking device to be presented as a single logical networking device.

8. The IHS of claim 7, wherein the data packet is a Broadcast, unknown Unicast, and Multicast (BUM) data packet.

9. The IHS of claim 7, wherein the identifying the virtual network associated with the first host device includes:
identifying a Virtual Network Interface (VNI) identifier that provides the virtual network identifier and that is associated with a port that is coupled to the processing system and that is connected to the first host device.

10. The IHS of claim 9, wherein the generating the first packet forwarding identifier based on the first portion of the virtual network identifier, and the generating the second packet forwarding identifier based on the second portion of the virtual network identifier, includes:

generating, using a first 12 bits of the VNI identifier, the first packet forwarding identifier; and generating, using a second 12 bits of the VNI identifier, the second packet forwarding identifier.

11. The IHS of claim 7, wherein the inter-networking device packet forwarding engine is configured to:

provide the first packet forwarding identifier in an E-Channel Identifier (ECID) field included in the data packet; and provide the second packet forwarding identifier in a VLAN identifier field included in the data packet.

12. The IHS of claim 7, wherein the first packet forwarding identifier and the second packet forwarding identifier provided in the data packet are configured for use by the aggregated networking device to:

identify, using the first packet forwarding identifier and the second packet forwarding identifier provided in the data packet, the virtual network;

determine the one of the plurality of second host devices that is associated with the virtual network; and forward the data packet to that one of the plurality of second host devices.

13. The IHS of claim 7, wherein the data packet is a known unicast data packet that is configured to be transmitted via an orphan port on the aggregated networking device.

14. A method for forwarding packets between networking devices in a VXLAN multi-tenant system, comprising:

receive, by a first aggregated networking device from a first host device, a data packet;

identifying, by the first aggregated networking device in response to receiving the data packet, a virtual network associated with the first host device;

generating, by the first aggregated networking device based on a first portion of a virtual network identifier that identifies the virtual network, a first packet forwarding identifier;

generating, by the first aggregated networking device based on a second portion of the virtual network identifier that identifies the virtual network, a second packet forwarding identifier;

providing, by the first aggregated networking device in the data packet, the first packet forwarding identifier and the second packet forwarding identifier; and forwarding, by the first aggregated networking device via an Inter-Chassis Link (ICL), the data packet to a second aggregated networking device, wherein the first packet forwarding identifier and the second packet forwarding identifier provided in the data packet are configured for use by the second aggregated networking device to forward the data packet to one of a plurality of second host devices that are connected to the aggregated networking device, and wherein the first aggregated networking device and the second aggregated networking device are aggregated according to an aggregation protocol to provide an aggregation domain that causes the first aggregated networking device and the second aggregated networking device to be presented as a single logical networking device.

15. The method of claim 14, wherein the data packet is a Broadcast, unknown Unicast, and Multicast (BUM) data packet.

16. The method of claim 14, wherein the identifying the virtual network associated with the first host device includes:

identifying a Virtual Network Interface (VNI) identifier that provides the virtual network identifier and that is associated with a port that is coupled to the processing system and that is connected to the first host device.

17. The method of claim 16, wherein the generating the first packet forwarding identifier based on the first portion of the virtual network identifier, and the generating the second packet forwarding identifier based on the second portion of the virtual network identifier, includes:

generating, using a first 12 bits of the VNI identifier, the first packet forwarding identifier; and generating, using a second 12 bits of the VNI identifier, the second packet forwarding identifier.

18. The method of claim 14, further comprising:

providing, by the first aggregated networking device, the first packet forwarding identifier in an E-Channel Identifier (ECID) field included in the data packet; and providing, by the first aggregated networking device, the second packet forwarding identifier in a VLAN identifier field included in the data packet.

19. The method of claim 14, wherein the first packet forwarding identifier and the second packet forwarding identifier provided in the data packet are configured for use by the second aggregated networking device to:

identifying, by the second aggregated networking device using the first packet forwarding identifier and the second packet forwarding identifier provided in the data packet, the virtual network;

determining, by the second aggregated networking device, the one of the plurality of second host devices that is associated with the virtual network; and forwarding, by the second aggregated networking device, the data packet to that one of the plurality of second host devices.

20. The method of claim 14, wherein the data packet is a known unicast data packet that is configured to be transmitted via an orphan port on the aggregated networking device.

* * * * *